United States Patent
Uno et al.

(10) Patent No.: US 8,982,917 B2
(45) Date of Patent: Mar. 17, 2015

(54) SOLID-STATE LASER DEVICE

(71) Applicant: Shimadzu Corporation, Kyoto-shi, Kyoto (JP)

(72) Inventors: Shingo Uno, Kyoto (JP); Naoya Ishigaki, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 13/904,397

(22) Filed: May 29, 2013

(65) Prior Publication Data

US 2014/0355632 A1    Dec. 4, 2014

(51) Int. Cl.
*H01S 3/13*    (2006.01)
*H01S 3/106*    (2006.01)

(52) U.S. Cl.
CPC .................................. *H01S 3/1068* (2013.01)
USPC ..................................................... 372/29.011

(58) Field of Classification Search
CPC ....... H01S 3/025; H01S 3/0401; H01S 5/026; H01S 3/1068
USPC ............................. 372/29.011, 71, 96, 22, 72
See application file for complete search history.

(56) References Cited

U.S. PATENT DOCUMENTS

| 5,317,376 A * | 5/1994 | Amzajerdian et al. ........ 356/28.5 |
| 5,339,323 A * | 8/1994 | Hunter et al. .................. 372/25 |
| 2009/0059967 A1* | 3/2009 | Chiang et al. .................. 372/12 |

FOREIGN PATENT DOCUMENTS

| JP | 08153924 | 6/1996 |
| JP | 2006-253195 | 9/2006 |
| JP | 2009-218446 A | 9/2009 |

OTHER PUBLICATIONS

US-JP 2009-218446, Sep. 2009, Sakashita Yukio.*
US-JP 08-153924, Jun. 1996, Nakayasu Takae.*
Japanese Office Action issued Dec. 10, 2013 in Japanese Patent Application No. 2010-276483.

* cited by examiner

*Primary Examiner* — Tuan Nguyen
(74) *Attorney, Agent, or Firm* — Sughrue Mion, PLLC

(57) ABSTRACT

A control circuit measures fluctuations in the energy of a pulse laser with respect to the power of an RF signal by varying the power of the RF signal, determines the minimum power of the RF signal which yields a permissible level of fluctuation, and sets the power of the RF signal based on the minimum power of the RF signal. Heat generation in the RF signal generation circuit can be suppressed, and the overall power consumption can also be reduced. It is also possible to reduce the time from when the RF signal is turned on until the RF signal is turned off. As a result, it is possible to generate a stable pulse laser.

12 Claims, 3 Drawing Sheets

SOLID-STATE LASER DEVICE

TECHNICAL FIELD

The present invention relates to a solid-state laser. More particularly, the present invention relates to a solid-state laser capable of optimizing the power of an RF signal applied to an acousto-optical element.

BACKGROUND ART

Laser oscillators, which control an RF signal applied to an acousto-optical element to generate a pulse laser, have long been known (for example, see Patent Literature 1).

PRIOR ART LITERATURES (PATENT LITERATURE 1) Japanese Unexamined Patent Application Publication 2009-218446

SUMMARY OF THE INVENTION

In a solid-state laser device such as the laser oscillator described above, when the power of an RF signal is made sufficiently large and the RF signal is turned on, the loss of a resonator including an acousto-optical element becomes large, which precludes laser oscillation from occurring and causes the gain of the laser medium contained in the resonator to increase. When the RF signal is suddenly turned off from this state, the loss of the resonator becomes small and laser oscillation is performed so that a pulse-like laser is outputted from the laser medium having an increased gain.

If the power of the RF signal is insufficient, the pulse laser output becomes unstable, so the power of the RF signal is typically set to at least several W.

However, this has been problematic in that the heat generation in the RF signal generation circuit is large and the overall power consumption of the device also becomes large.

Therefore, the object of the present invention is to provide a solid-state laser capable of optimizing the power of an RF signal applied to an acousto-optical element so that the heat generation in the RF signal generation circuit can be suppressed and the overall power consumption of the device can be reduced.

In a first aspect, the present invention provides a solid-state laser comprising a semiconductor laser (1) for generating an excitation laser beam; a solid-state laser medium (2) which is excited by the excitation laser beam; an acousto-optical element (4) which is installed inside a resonator (3) formed so as to contain the solid-state medium (2) and which controls the loss of the resonator (3); a photodetector (6) for detecting a pulse laser; an RF signal generation circuit (9) for generating an RF signal for the acousto-optical element (4); and a control circuit (8) for controlling the power of the RF signal; wherein the control circuit (8) measures fluctuations in the power laser with respect to the power of the RF signal by varying the power of the RF signal, determines the minimum RF power level of the RF signal which yields a permissible level of fluctuation, and sets the power of the RF signal based on the minimum power of the RF signal.

In the solid-state laser device of the first aspect described above, fluctuations in the pulse laser with respect to the power of the RF signal are measured by varying the power of the RF signal to find the minimum power of the RF signal which yields a permissible level of fluctuation, and this minimum power of the RF signal is applied to the acousto-optical element. Alternatively, in order to provide flexibility, a power level of the RF signal slightly larger than the minimum power of the RF signal is applied to the acousto-optical element. Since power of the RF signal can be made smaller than the that of a conventional device in step with the degree to which the permissible level of fluctuation is increased, the heat generation in the RF signal generation circuit can be suppressed, and the overall power consumption of the device can also be reduced.

It is preferable for the user to be able to set the permissible level of fluctuation in accordance with the application.

If the amount of time from when the RF signal is turned on until the RF signal is turned off becomes long, the original pulse will no longer be generated, resulting in double pulses. In contrast, in the present invention, since the power of the RF signal can be reduced, it is possible to reduce the amount of time from when the RF signal is turned on until the RF signal is turned off, which makes it possible to generate a stable pulse laser from this perspective as well.

In a second aspect, the present invention provides a solid-state laser according to the first aspect, wherein the control circuit (8) repeatedly calculates the variance of the energy from the energy of each of three or more pulses for a given power level of the RF signal while varying the power of the RF signal, determines the minimum power of the RF signal which yields a value equal to or less than the permissible variance, and sets the power of the RF signal based on the minimum power of the RF signal.

In the solid-state laser device of the second aspect described above, fluctuations in the pulse laser are measured using the variance of the energy of each pulse as an index.

In a third aspect, the present invention provides a solid-state laser according to the first aspect, wherein the control circuit (8) repeatedly calculates the variance of the mean pulse power by measuring the energy of laser pulses over a prescribed amount of time three or more times for a given power level of the RF signal while varying the power of the RF signal, determines the minimum power of the RF signal which yields a value equal to or less than the permissible variance, and sets the power of the RF signal based on the minimum power of the RF signal.

In the solid-state laser device of the third aspect described above, fluctuations in the pulse laser are measured using the variance of the mean pulse power of the laser pulses over a prescribed amount of time as an index.

In a fourth aspect, the present invention provides a solid-state laser device according to one of the first to third aspects, wherein the control circuit (8) intermittently optimizes the power of the RF signal.

In the solid-state laser device of the fourth aspect described above, optimizing the power of the RF signal once daily, for example, makes it possible to correct any factors contributing to changes over time such as the reduction of the diffraction effect of the acousto-optical element.

In a fifth aspect, the present invention provides a solid-state laser device according to one of the first to third aspects, wherein the control circuit (8) continuously optimizes the power of the RF signal.

In the solid-state laser device of the fifth aspect described above, it is possible to correct factors contributing to disturbance such as changes in the environmental temperature.

With the solid-state laser device of the present invention, since power of the RF signal can be made smaller than the that of a conventional device in step with the degree to which the permissible level of fluctuation is increased, the heat generation in the RF signal generation circuit can be suppressed, and the overall power consumption of the device can also be reduced.

DETAILED DESCRIPTION OF THE EXEMPLARY EMBODIMENTS

Figure 1:
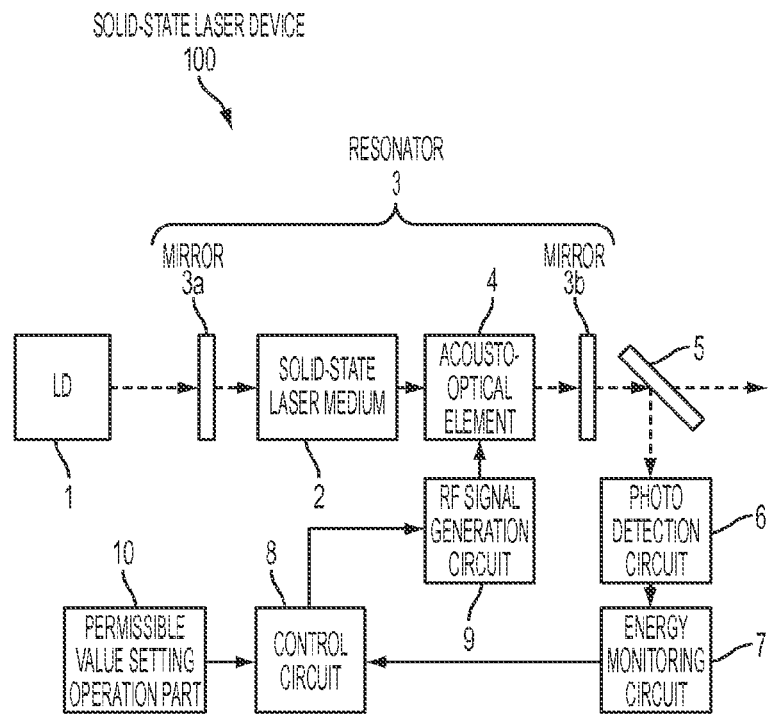
FIG. 1 is a schematic explanatory diagram showing a solid-state laser device of Embodiment 1.

The present invention will be described in further detail hereinafter using the embodiments shown in the drawings. However, the present invention is not limited by these embodiments.

Embodiment 1

FIG. 1 is an explanatory diagram showing a solid-state laser device 100 of Embodiment 1.

This solid-state laser device 100 comprises a semiconductor laser 1 for generating an excitation laser beam; an input side mirror 3a; a solid-state laser medium 2 which is excited by the excitation laser beam; an acousto-optical element 4 constituting a Q switch; an output side minor 3b; a beam splitter 5 for splitting part of a pulse laser transmitted through the output side minor 3b; a photodetector 6 for detecting the pulse laser split by the beam splitter 5; an energy monitoring circuit 7 for measuring the energy of the pulse laser from the output of the photodetector 6; an RF signal generation circuit 9 for generating an RF signal for the acousto-optical element 4; a control circuit 8 for indicating the magnitude of the power of the RF signal and controlling the on/off state of the RF signal; and a permissible value setting operation part 10 with which an operator performs a setting operation to set a permissible value.

A resonator 3 comprises the input side mirror 3a, the solid-state laser medium 2, the acousto-optical element 4, and the output side minor 3b.

Figure 2:
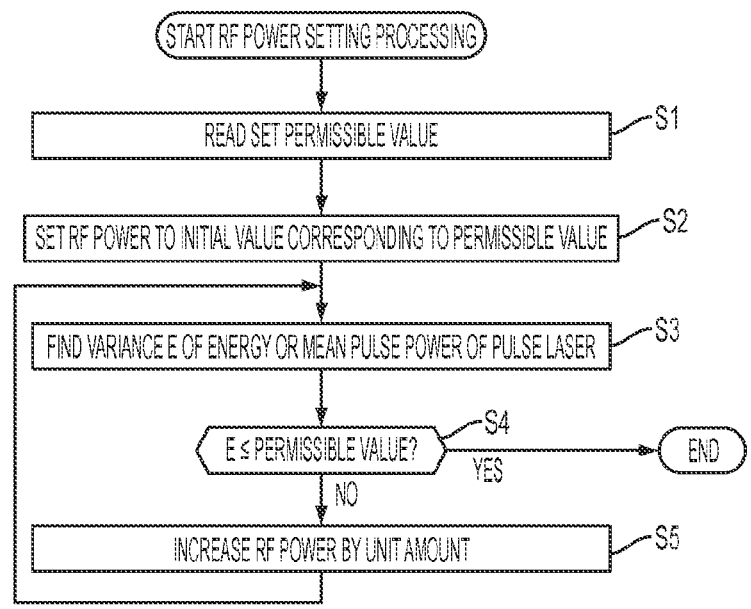
FIG. 2 is a flowchart showing the processing for setting the RF power (power of an RF signal) in the solid-state laser device of Embodiment 1.

FIG. 2 is a flowchart showing the processing for setting the RF power in the control circuit 8. This RF power setting processing is executed intermittently such as when the power is turned on or after a certain amount of time has passed, for example.

In step S1, a permissible value set by the permissible value setting operation part 10 is read.

Figure 3:
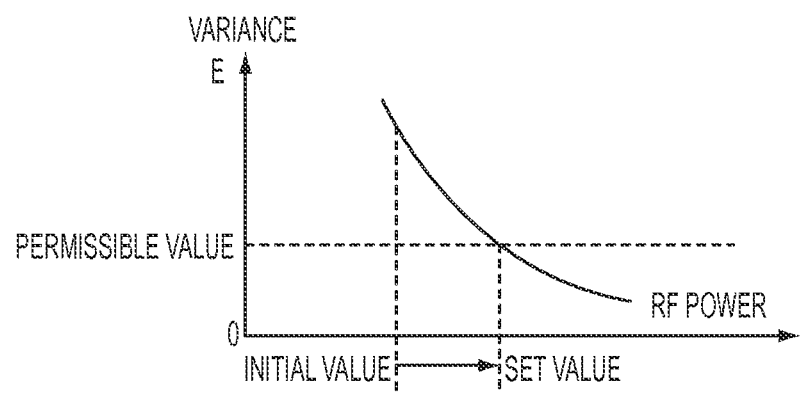
FIG. 3 is a graph showing the relationship between the RF power and variance.

In step S2, as shown in FIG. 3, the RF power is set to an initial value which definitely does not satisfy the read permissible value. A table of initial values with respect to various permissible values is stored in advance, and an initial value which definitely does not satisfy the read permissible value should be obtained by searching for the initial value corresponding to the read permissible value.

Figure 4:
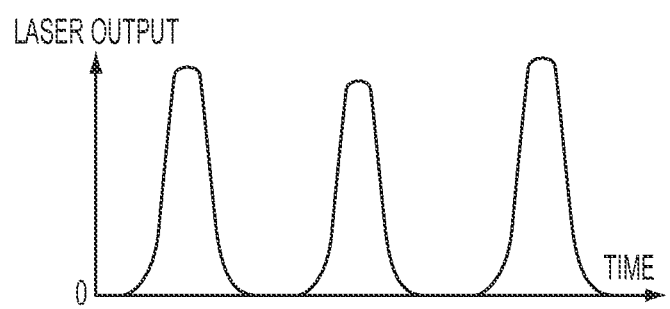
FIG. 4 is a waveform chart of the pulse laser output.

In step S3, as shown in FIG. 4, the energy of each pulse of the laser output is measured, and the variance E of the energy is calculated from the measurement results for three or more pulses. Alternatively, the mean pulse power including a plurality of pulses is repeatedly measured three or more times, and the variance E of the mean pulse power is calculated from the measurement results.

In step S4, the processing is ended if the calculated variance E satisfies the permissible value, and the process proceeds to step S5 if the variance E does not satisfy the permissible value. If the RF power is the initial value, it is certain that the variance E does not satisfy the permissible value, so the process proceeds to step S5.

In step S5, the RF power is increased by a predetermined prescribed unit amount (for example, 0.1 W). The process then returns to step S3.

By repeating steps S3 to S5, the set value of the RF power becomes the minimum value to satisfy the permissible value, as shown in FIG. 3.

With the solid-state laser device 100 of Embodiment 1, the power of the RF signal becomes the minimum value to satisfy the permissible value, so it is possible to suppress heat generation in the RF signal generation circuit 9 and to reduce the overall power consumption of the device. In addition, it is possible to reduce the amount of time from when the RF signal is turned on until the RF signal is turned off, which makes it possible to generate a stable pulse laser from this perspective as well.

Embodiment 2

Figure 5:
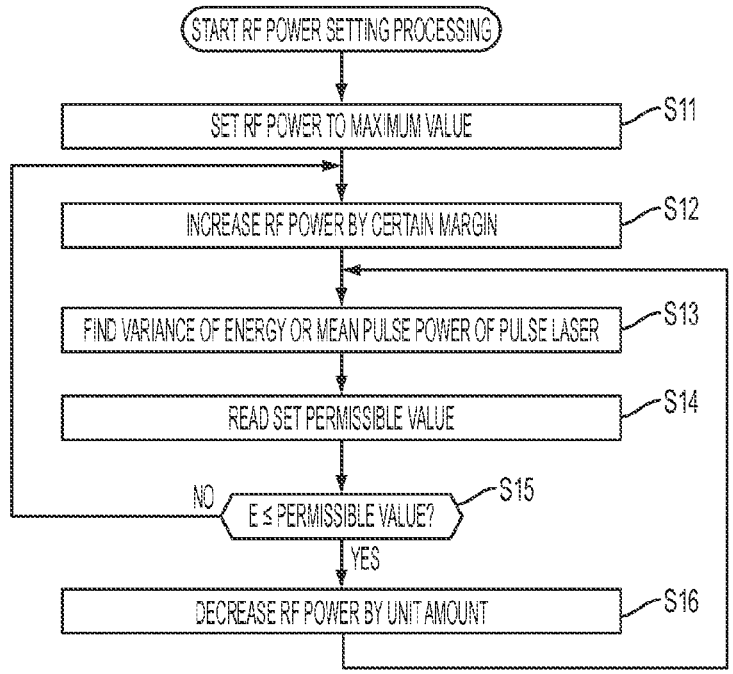
FIG. 5 is a flowchart showing the processing for setting the RF power in a solid-state laser device of Embodiment 2.

FIG. 5 is a flowchart showing the processing for setting the RF power in the control circuit 8 of Embodiment 2. This RF power setting processing is executed continuously at all times.

Figure 6:
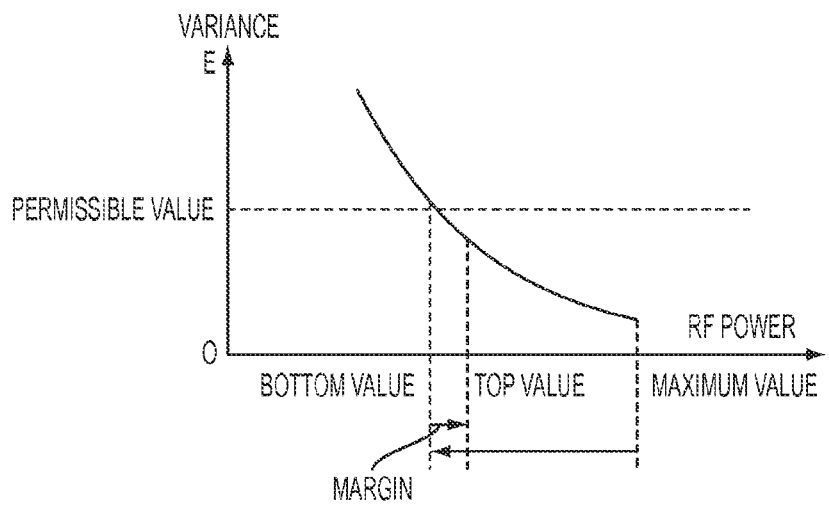
FIG. 6 is a graph showing the relationship between the RF power and variance.

In step S11, as shown in FIG. 6, the RF power is set to a maximum value.

In step S12, the RF power is increased by a predetermined prescribed margin (for example, 0.5 W). When the RF power is the maximum value, the value remains at the maximum value.

In step S13, as shown in FIG. 4, the energy of each pulse of the laser output is measured, and the variance E of the energy is calculated from the measurement results for three or more pulses. Alternatively, the mean pulse power including a plurality of pulses is repeatedly measured three or more times, and the variance E of the mean pulse power is calculated from the measurement results.

In step S14, the permissible value set by the permissible value setting operation part 10 is read.

In step S15, the process proceeds to step S16 if the calculated variance E satisfies the permissible value, and the process returns to step S12 if the variance E does not satisfy the permissible value.

In step S16, the RF power is reduced by a predetermined prescribed unit amount (for example, 0.1 W). The process then returns to step S13.

By repeating steps S12 to S16, the set value of the RF power cycles between a bottom value, which is a value that is smaller than the minimum value that satisfies the permissible value by a certain unit amount, and a top value, which is a value that is larger than this value by a certain margin, as shown in FIG. 6.

With the solid-state laser device 100 of Embodiment 2, the power of the RF signal becomes a value that is suppressed so as to satisfy the permissible value, so it is possible to suppress heat generation in the RF signal generation circuit 9 and to reduce the overall power consumption of the device. In addition, it is possible to reduce the amount of time from when the RF signal is turned on until the RF signal is turned off, which makes it possible to generate a stable pulse laser from this perspective as well.

The solid-state laser device of the present invention can be used in the field of bioengineering or the field of measurements.

EXPLANATION OF REFERENCES 1 semiconductor laser
2 solid-state laser medium
3 resonator
3a input side mirror
3b output side mirror
4 acousto-optical element
5 beam splitter
6 photodetector
7 energy monitoring circuit
8 control circuit
9 RF signal generation circuit
10 permissible value setting operation part
100 solid-state laser device

What is claimed is:

1. A solid-state laser, comprising:
a semiconductor laser for generating an excitation laser beam;
a solid-state laser medium which is excited by said excitation laser beam;
a resonator formed so as to contain said solid-state medium;
an acousto-optical element which is installed inside said resonator and which controls the loss of said resonator;
a photodetector for detecting at least a portion of a pulse laser output from an output side mirror of said resonator;
an RF signal generation circuit for generating an RF signal for said acousto-optical element; and
a control circuit for maintaining the power of said RF signal at a preset prescribed value; wherein fluctuations in said pulse laser with respect to the power of the RF signal are measured by the photodetector by varying the power of said RF signal so that said prescribed value is set based on the minimum power of the RF signal which yields a permissible level of fluctuation,
wherein said control circuit repeatedly calculates the variance of the energy from the energy of each of three or more pulses for a given power level of the RF signal while varying the power of said RF signal, determines the minimum power of the RF signal which yields a value equal to or less than the permissible variance, and sets the power of said RF signal based on the minimum power of the RF signal.

2. The solid-state laser according to claim 1, wherein said control circuit intermittently optimizes the power of said RF signal.

3. The solid-state laser according to claim 1, wherein said control circuit continuously optimizes the power of said RF signal.

4. A solid-state laser, comprising:
a semiconductor laser for generating an excitation laser beam;
a solid-state laser medium which is excited by said excitation laser beam;
a resonator formed so as to contain said solid-state medium;
an acousto-optical element which is installed inside said resonator and which controls the loss of said resonator;
a photodetector for detecting at least a portion of a pulse laser output from an output side mirror of said resonator;
an RF signal generation circuit for generating an RF signal for said acousto-optical element; and
a control circuit for maintaining the power of said RF signal at a preset prescribed value; wherein fluctuations in said pulse laser with respect to the power of the RF signal are measured by the photodetector by varying the power of said RF signal so that said prescribed value is set based on the minimum power of the RF signal which yields a permissible level of fluctuation,
wherein said control circuit repeatedly calculates the variance of the mean pulse power by measuring the mean pulse power of laser pulses over a prescribed amount of time three or more times for a given power level of the RF signal while varying the power of said RF signal, determines the minimum power of the RF signal which yields a value equal to or less than the permissible variance, and sets the power of said RF signal based on the minimum power of the RF signal.

5. The solid-state laser according to claim 4, wherein said control circuit intermittently optimizes the power of said RF signal.

6. The solid-state laser according to claim 4, wherein said control circuit continuously optimizes the power of said RF signal.

7. A method of operating a solid-state laser,
the solid-state laser comprising:
a semiconductor laser for generating an excitation laser beam;
a solid-state laser medium which is excited by said excitation laser beam;
a resonator formed so as to contain said solid-state medium;
an acousto-optical element which is installed inside said resonator and which controls the loss of said resonator;
a photodetector for detecting at least a portion of a pulse laser output from an output side mirror of said resonator;
an RF signal generation circuit for generating an RF signal for said acousto-optical element; and
a control circuit for maintaining the power of said RF signal at a preset prescribed value;
the method comprising:
measuring fluctuations in said pulse laser with respect to the power of the RF signal by the photodetector by varying the power of said RF signal so that said prescribed value is set based on the minimum power of the RF signal which yields a permissible level of fluctuation, and
repeatedly calculating, by the control circuit, the variance of the energy from the energy of each of three or more pulses for a given power level of the RF signal while varying the power of said RF signal, determining the minimum power of the RF signal which yields a value equal to or less than the permissible variance, and setting the power of said RF signal based on the minimum power of the RF signal.

8. The method of claim 7, further comprising:
intermittently optimizing, by the control circuit, the power of said RF signal.

9. The method of claim 7, further comprising:
continuously optimizing, by the control circuit, the power of said RF signal.

10. A method of operating a solid-state laser,
the solid-state laser comprising:
a semiconductor laser for generating an excitation laser beam;
a solid-state laser medium which is excited by said excitation laser beam;
a resonator formed so as to contain said solid-state medium;

an acousto-optical element which is installed inside said resonator and which controls the loss of said resonator;

a photodetector for detecting at least a portion of a pulse laser output from an output side mirror of said resonator;

an RF signal generation circuit for generating an RF signal for said acousto-optical element; and a control circuit for maintaining the power of said RF signal at a preset prescribed value;

the method comprising:

measuring fluctuations in said pulse laser with respect to the power of the RF signal by the photodetector by varying the power of said RF signal so that said prescribed value is set based on the minimum power of the RF signal which yields a permissible level of fluctuation, and repeatedly calculating, by the control circuit, the variance of the mean pulse power by measuring the mean pulse power of laser pulses over a prescribed amount of time three or more times for a given power level of the RF signal while varying the power of said RF signal, determining the minimum power of the RF signal which yields a value equal to or less than the permissible variance, and setting the power of said RF signal based on the minimum power of the RF signal.

11. The method of claim 10, further comprising:

intermittently optimizing, by the control circuit, the power of said RF signal.

12. The method of claim 10, further comprising:

continuously optimizing, by the control circuit, the power of said RF signal.

\* \* \* \* \*